UNITED STATES PATENT OFFICE.

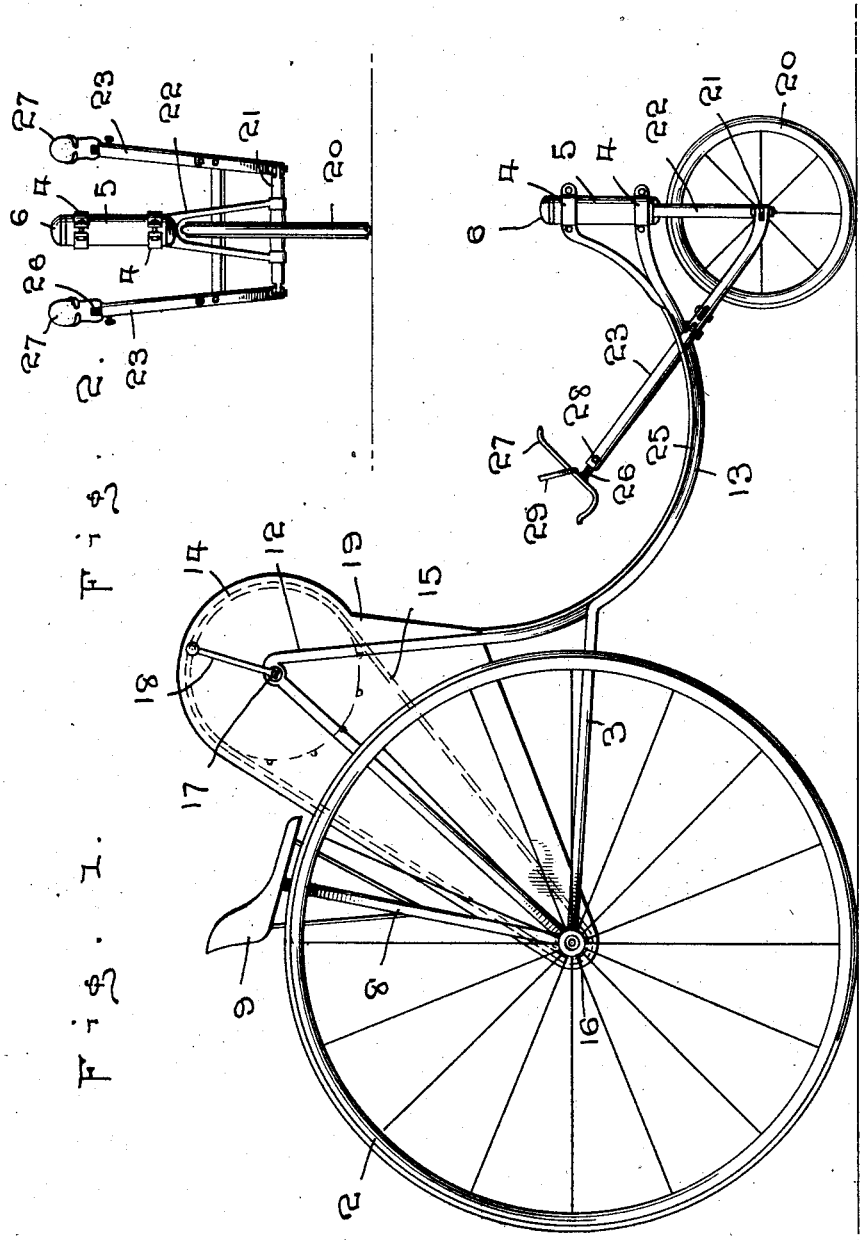

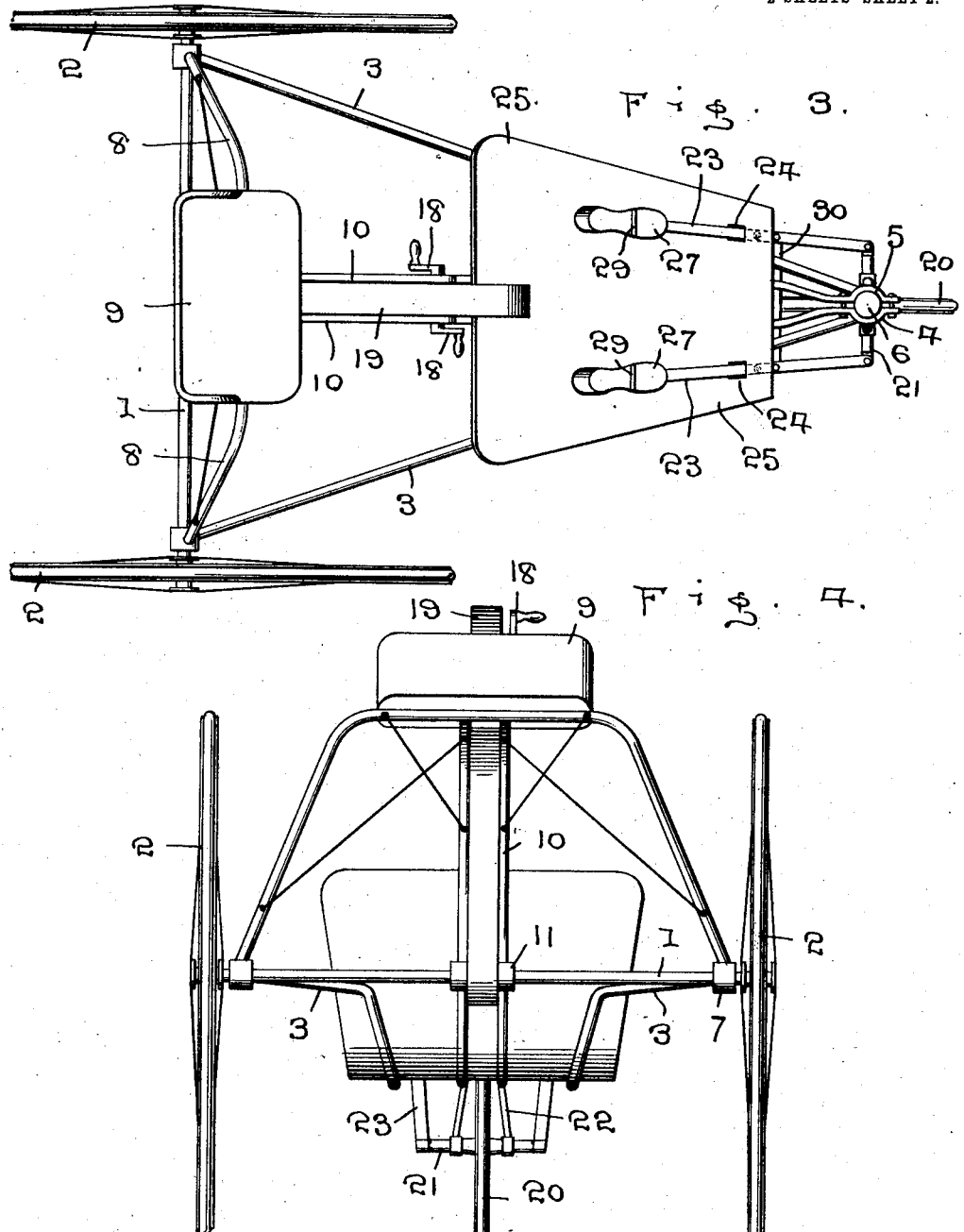

DAVID CROCKETT, OF BIRMINGHAM, ALABAMA.

TRICYCLE.

997,439.  Specification of Letters Patent.  Patented July 11, 1911.

Application filed January 25, 1910. Serial No. 539,948.

*To all whom it may concern:*

Be it known that I, DAVID CROCKETT, a citizen of the United States, residing at Birmingham, in the county of Jefferson and State of Alabama, have invented certain new and useful Improvements in Tricycles; and I do hereby declare the following to be a full, clear, and exact description of the invention, such as will enable others skilled in the art to which it appertains to make and use the same.

My invention relates to new and useful improvements in tricycles or similarly constructed vehicles and my object is to provide a vehicle which is adapted to be manually propelled and steered by means of a foot operated mechanism.

A further object is to provide means for operating the guiding wheel of the vehicle.

A further object is to provide suitable plates to receive the feet of the occupant of the vehicle, said plates being attached to the guiding mechanism.

Other objects and advantages will be hereinafter described and more particularly pointed out in the specification and claims.

In the accompanying drawings which are made a part of this application, Figure 1 is a side elevation of the vehicle. Fig. 2 is a front elevation of the guiding wheel and the mechanism for operating the same. Fig. 3 is a top plan view of the vehicle, and, Fig. 4 is a rear elevation thereof.

Referring to the drawings in which similar reference numerals designate corresponding parts throughout the several views, 1 indicates the rear axle of the vehicle, which may be constructed in any suitable manner, to the ends of which are attached propelling wheels 2 which are preferably fixed to the axle and adapted to rotate therewith.

A frame composed of sets of bars extends forwardly from said rear axle and is mounted on a socket 5 surrounding a standard 6 which is rotatably mounted therein. The forward end of the frame is looped to give a spring motion or resiliency to the vehicle in the operation thereof, and portions of said frame are also disposed so as to provide for a manually operated propelling means. Extending upwardly from the rear axle is an arch bar 8 carrying a seat 9 and it will be seen that the same is so disposed as to be adjacent the propelling means. The standard 6 is bifurcated at its lower end to receive a guide wheel 20, the axle 21 upon which the wheel 20 is mounted extending a distance beyond the fork 22 formed by bifurcating the standard and to the ends of the axle are pivotally secured pitmen 23, said pitmen being preferably formed in two sections and pivotally secured together at a point below the frame bars 3 so that the lower portions of the pitmen may swing to conform to the movement of the axle 21, while the upper portions thereof retain their normal planes or positions. The upper portions of the pitmen 23 extend through openings 24 in a platform 25, said openings serving to properly guide the upper portions of the pitmen, the platform being curved to conform to the curved portions of the bars 3 and 10, said platform also forming a guard for the feet of the operator to prevent mud, etc., from coming in contact therewith from the guide wheel 20.

The pitmen are preferably constructed of hollow tubing and into the upper ends thereof are introduced the stems 26 of plates or foot rests 27, the rear ends of said plates being extended upwardly and curved to form seats for the heels of the operator and by providing suitable set screws 28, the plates 27 may be readily adjusted to accommodate limbs of various lengths. The plates 27 are also provided with loops 29 through which the feet of the operator are to be extended and by means of which an upward pull may be made on the pitmen with one foot, when a downward pressure is directed on the opposite plate with the other foot or if the operator has but one foot, the front wheel may be properly guided in this manner as a downward pressure may be employed for swinging the wheel in one direction and an upward pull through the medium of the loop to direct the guide wheel in the opposite direction. The lower sections of the pitmen 23 are held against swinging motion or spaced from each other by means of a link or strap, 30, the ends of which are pivotally secured to the lower portions of the pitmen adjacent the pivotal points of the two sections of the pitmen.

In operation, the operator occupies the seat 9 and places his feet in engagement with the plates 27, when by grasping the cranks 18 and rotating the same the vehicle will be propelled forwardly and it will be readily seen that a person with but one hand may readily propel the vehicle, as there is a crank at each side of the sprocket.

What I claim is:

1. In a vehicle of the class described, the combination with a steering wheel and axle therefor, of a steering mechanism comprising pitmen pivoted at their lower ends to the ends of said axle, said pitmen being formed in sections and pivoted to one another, a strap pivotally connecting the lower sections of said pitmen, means to guide the upper sections of said pitmen, and foot rests carried by said pitmen adapted for use by the operator.

2. In a vehicle of the class described, the combination with a frame mounted on wheels, one of said wheels being adapted for steering purposes and a platform carried by said frame; of a steering mechanism comprising pitmen pivoted at their lower ends to the axle of said steering wheel, said pitmen being formed in sections and pivoted to one another, a strap pivotally connecting the lower sections of said pitmen, the upper sections thereof being guided through openings in said platform, and foot rests secured to said pitmen.

3. In a vehicle of the class described, the combination with a steering wheel and axle therefor, of pitmen pivotally connected at their lower ends to the ends of said axle, said pitmen being formed in sections and pivoted to one another, a strap pivotally connecting the lower sections of said pitmen, guiding means for the upper sections thereof, foot rests for the operator of the vehicle, and means to adjustably secure said foot rests to the upper sections of said pitmen.

In testimony whereof I have signed my name to this specification in the presence of two subscribing witnesses.

DAVID CROCKETT.

Witnesses:
THOS. C. WELCH,
E. W. SPENCER.

---

Copies of this patent may be obtained for five cents each, by addressing the "Commissioner of Patents, Washington, D. C."